US009469085B2

(12) United States Patent
Martin et al.

(10) Patent No.: US 9,469,085 B2
(45) Date of Patent: Oct. 18, 2016

(54) STRUCTURE FOR TUNING WELD HEAT DISSIPATION

(71) Applicant: Kulite Semiconductor Products, Inc., Leonia, NJ (US)

(72) Inventors: Richard Martin, Ridgewood, NJ (US); Louis DeRosa, Wayne, NJ (US); Robert Gardner, Westwood, NJ (US)

(73) Assignee: Kulite Semiconductor Products, Inc., Leonia, NJ (US)

( * ) Notice: Subject to any disclaimer, the term of this patent is extended or adjusted under 35 U.S.C. 154(b) by 117 days.

(21) Appl. No.: 14/228,643

(22) Filed: Mar. 28, 2014

(65) Prior Publication Data

US 2014/0295201 A1  Oct. 2, 2014

Related U.S. Application Data

(60) Provisional application No. 61/806,013, filed on Mar. 28, 2013.

(51) Int. Cl.
*B23K 31/02* (2006.01)
*B32B 7/04* (2006.01)
*B32B 15/01* (2006.01)
*B23K 31/00* (2006.01)
*B23K 33/00* (2006.01)
*B23K 35/02* (2006.01)

(52) U.S. Cl.
CPC ............... *B32B 7/04* (2013.01); *B23K 31/003* (2013.01); *B23K 33/00* (2013.01); *B23K 33/006* (2013.01); *B23K 35/0255* (2013.01); *B32B 15/01* (2013.01); *B32B 2307/302* (2013.01); *Y10T 428/12347* (2015.01); *Y10T 428/12389* (2015.01)

(58) Field of Classification Search
None
See application file for complete search history.

(56) References Cited

U.S. PATENT DOCUMENTS

| 4,246,978 A * | 1/1981 | Schulz | B60K 3/00 180/165 |
| 2005/0248434 A1* | 11/2005 | Kurtz | B23K 15/0053 338/42 |
| 2008/0229838 A1* | 9/2008 | Kleven | G01L 19/003 73/720 |

* cited by examiner

Primary Examiner — Vera Katz
(74) Attorney, Agent, or Firm — Troutman Sanders LLP; James E. Schutz; Mark Lehi Jones

(57) ABSTRACT

Systems and method for controlling the flow and dissipation of thermal energy away from a weld between two components are provided. In one example embodiment, a structure may comprise a protrusion; a first component thermally coupled to the protrusion; a second component having a lower heat dissipation rate than the first component; a weld formed using a welding process to couple the protrusion to the second component, wherein the welding process generates thermal energy; and wherein the first component in combination with the protrusion dissipates the thermal energy from the welding process at about an equivalent rate as the second component.

10 Claims, 3 Drawing Sheets

300

301 — IN A STRUCTURE HAVING A FIRST COMPONENT THERMALLY COUPLED TO A PROTRUSION AND A SECOND COMPONENT HAVING A LOWER HEAT DISSIPATION RATE THAN THE FIRST COMPONENT, FORMING A WELD BETWEEN THE PROTRUSION AND THE SECOND COMPONENT USING A WELDING PROCESS, WHEREIN THE WELDING PROCESS GENERATES HEAT ENERGY

303 — DISSIPATING, BY THE FIRST COMPONENT IN COMBINATION WITH THE PROTRUSION, THE HEAT ENERGY FROM THE WELDING PROCESS AT A FIRST HEAT DISSIPATION RATE

305 — DISSIPATING, BY THE SECOND COMPONENT, THE HEAT ENERGY FROM THE WELDING PROCESS AT A SECOND HEAT DISSIPATION RATE, WHEREIN THE FIRST HEAT DISSIPATION RATE IS ABOUT EQUIVALENT TO THE SECOND HEAT DISSIPATION RATE.

FIG. 3

STRUCTURE FOR TUNING WELD HEAT DISSIPATION

CROSS-REFERENCE TO RELATED APPLICATIONS

This application claims priority under 35 U.S.C. §119(e) to U.S. Prov. App. No. 61/806,013, entitled "STRUCTURE FOR TUNING WELD HEAT DISSIPATION," filed Mar. 28, 2013, which is hereby incorporated by reference as if fully set forth herein.

TECHNICAL FIELD

The present invention relates generally to welds and more particularly to a structure for tuning weld heat dissipation and methods for manufacturing and using the same.

BACKGROUND

Methods for welding two pieces of metal together are well-known. As one skilled in the art will appreciate, there are many techniques utilized for making strong, long lasting welds for various assemblies, for example but not limited to, pressure transducer assemblies. However, the application of thermal energy in welding two components may lead to an uneven distribution or dissipation of the thermal energy in the two components, since the thermal energy distributes or dissipates faster in a larger mass than in a smaller mass. A first component may be capable of distributing or dissipating thermal energy within its mass faster than a second component, since the mass of the first component is greater than a mass of the second component. Further, thermal energy from welding the weld may dissipate slower in the second component than the first component, resulting in a temperature of the second component increasing at a fluster rate and being greater than a temperature of the first component. This combination may lead to an area near the weld on the second component having a higher temperature for a longer time than an area near the weld on the first component. Therefore, when the masses of the two components being welded are different, the thermal energy from welding may cause stress to the weld, which may be associated with the two components cooling at different rates. Thus, when the weld is initially applied between the two components, it may appear to be a strong weld. However, the weld may fail, for instance, after a large number of cycles due to fatigue and crack propagation.

For example, FIG. 1 illustrates a longitudinal cross-sectional view of a prior art assembly 100 having a weld 104 between a first component 101 and a second component 103. The first component 101 is connected to the second component 103. As illustrated, the first component 101 is larger than the second component 103. In one example, the first component 101 may be a header assembly and the second component 103 may be a sensor mounted to the header assembly. The first component 101 includes a small step 102 onto which the second component 103 is connected. A weld 104 is used to connect the first component 101 to the second component 103. As one skilled in the art will appreciate, welding a weld creates substantial heat, which locally heats both sides of the weld to higher temperatures. It shall be understood that, because of its size, the welding temperature applied to the second component 103 heats faster and, in some instances, to a higher temperature than the first component 101. However, the heat applied to the first component 101 associated with the weld 104 may dissipate faster than the heat applied to the second component 103 since a thermal mass of the first component 101 is greater than a thermal mass of the second component 103, resulting in the first component 101 being able to dissipate the heat from the weld 104 at a faster rate than the second component 103. Thus, the heat applied to the second component 103 while welding the weld 104 dissipates at a slower rate than the first component 101 since the second component 103 has less mass to dissipate the heat, resulting in an area near the weld on the second component 103 remaining at a higher temperature than an area near the weld 104 in the first component 101.

This mismatch in thermal energy dissipation between the first component 101 and the second component 103 may create stress within the weld 104. This stress, however, is not always immediately evident after the weld 104 is made, but it may cause the weld 104 to fail due to, for instance, fatigue crack growth over time. Accordingly, there is a need for improved techniques to allow for tuning heat dissipation of a weld connecting two different sized components. In addition, other desirable features and characteristics of the present disclosure will become apparent from the subsequent detailed description and claims, taken in conjunction with the accompanying figures and the foregoing technical field and background.

SUMMARY OF THE DISCLOSURE

Briefly described, embodiments of the present disclosure relate to a structure for tuning weld heat dissipation. According to one aspect, a structure may be configured to include a first component, a second component and a protrusion. The first component may be thermally coupled to the protrusion. Further, the second component may have a lower heat dissipation rate than the first component. A weld may be formed using a welding process to couple the protrusion to the second component. Also, the welding process may generate thermal energy. The first component in combination with the protrusion may dissipate the thermal energy from the welding process at about an equivalent rate as the second component.

According to another aspect, a method may include, in a structure having a first component thermally coupled to a protrusion and a second component having a lower heat dissipation rate than the first component, forming a weld between the protrusion and the second component using a welding process. The welding process may generate thermal energy. The method may include dissipating, by the first component in combination with the protrusion, the thermal energy from the welding process at a first heat dissipation rate. Further, the method may include dissipating, by the second component, the thermal energy from the welding process at a second heat dissipation rate. The first heat dissipation rate may be about equivalent to the second heat dissipation rate.

BRIEF DESCRIPTION OF THE DRAWINGS

The present disclosure is illustrated by way of examples, embodiments and the like and is not limited by the accompanying figures, in which like reference numbers indicate similar elements. Elements in the figures are illustrated for simplicity and clarity and have not necessarily been drawn to scale. The figures along with the detailed description are incorporated and form part of the specification and serve to further illustrate examples, embodiments and the like, and explain various principles and advantages, in accordance with the present disclosure, where:

FIG. 3 is a flowchart of one embodiment of a method of dissipating heat in a structure in accordance with various aspects as described herein.

DETAILED DESCRIPTION

Figure 1:
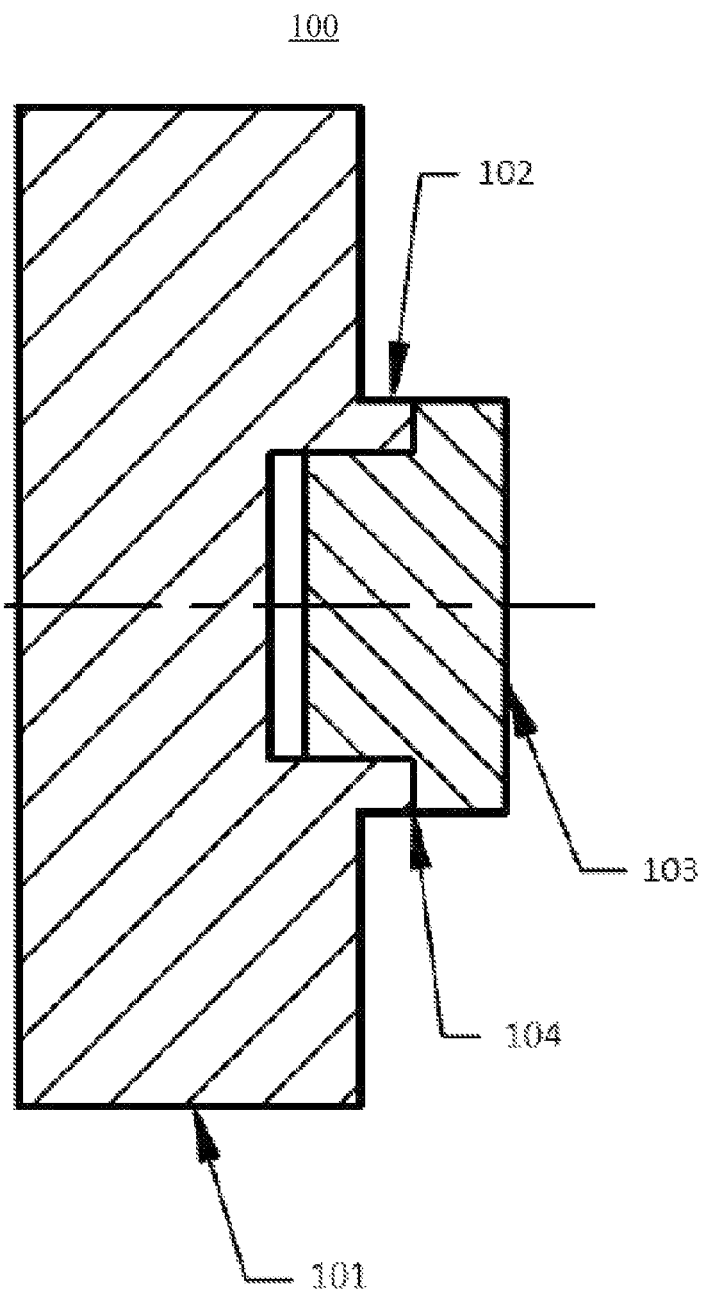
FIG. 1 illustrates a longitudinal cross-sectional view of a prior art assembly having a weld between a first component and a second component.

The following detailed description is merely illustrative in nature and is not intended to limit the present disclosure, or the application and uses of the present disclosure. Furthermore, there is no intention to be bound by any expressed or implied theory presented in the preceding field of use, background, or summary of the disclosure or the following detailed description. The present disclosure provides various examples, embodiments and the like, which may be described herein in terms of functional or logical block elements. Various techniques described herein may be used for a structure for tuning weld heat dissipation. The various aspects described herein are presented as methods, devices (or apparatus), and systems that may include a number of components, elements, members, modules, nodes, peripherals, or the like. Further, these methods, devices, and systems may include or not include additional components, elements, members, modules, nodes, peripherals, or the like.

Throughout the specification and the claims, the following terms take at least the meanings explicitly associated herein, unless the context clearly dictates otherwise. The terms "connect," "connecting," and "connected" mean that one function, feature, structure, or characteristic is directly joined to or in communication with another function, feature, structure, or characteristic. The terms "couple," "coupling," and "coupled" mean that one function, feature, structure, or characteristic is directly or indirectly joined to or in communication with another function, feature, structure, or characteristic. Relational terms such as "first" and "second," and the like may be used solely to distinguish one entity or action from another entity or action without necessarily requiring or implying any actual such relationship or order between such entities or actions. The term "or" is intended to mean an inclusive or. Further, the terms "a," "an," and "the" are intended to mean one or more unless specified otherwise or clear from the context to be directed to a singular form. The term "include" and its various forms are intended to mean including but not limited to. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%.

In the following description, numerous specific details are set forth. However, it is to be understood that embodiments of the disclosed technology may be practiced without these specific details. References to "one embodiment," "an embodiment," "example embodiment," "various embodiments," and other like terms indicate that the embodiments of the disclosed technology so described may include a particular function, feature, structure, or characteristic, but not every embodiment necessarily includes the particular function, feature, structure, or characteristic. Further, repeated use of the phrase "in one embodiment" does not necessarily refer to the same embodiment, although it may.

Figure 2:
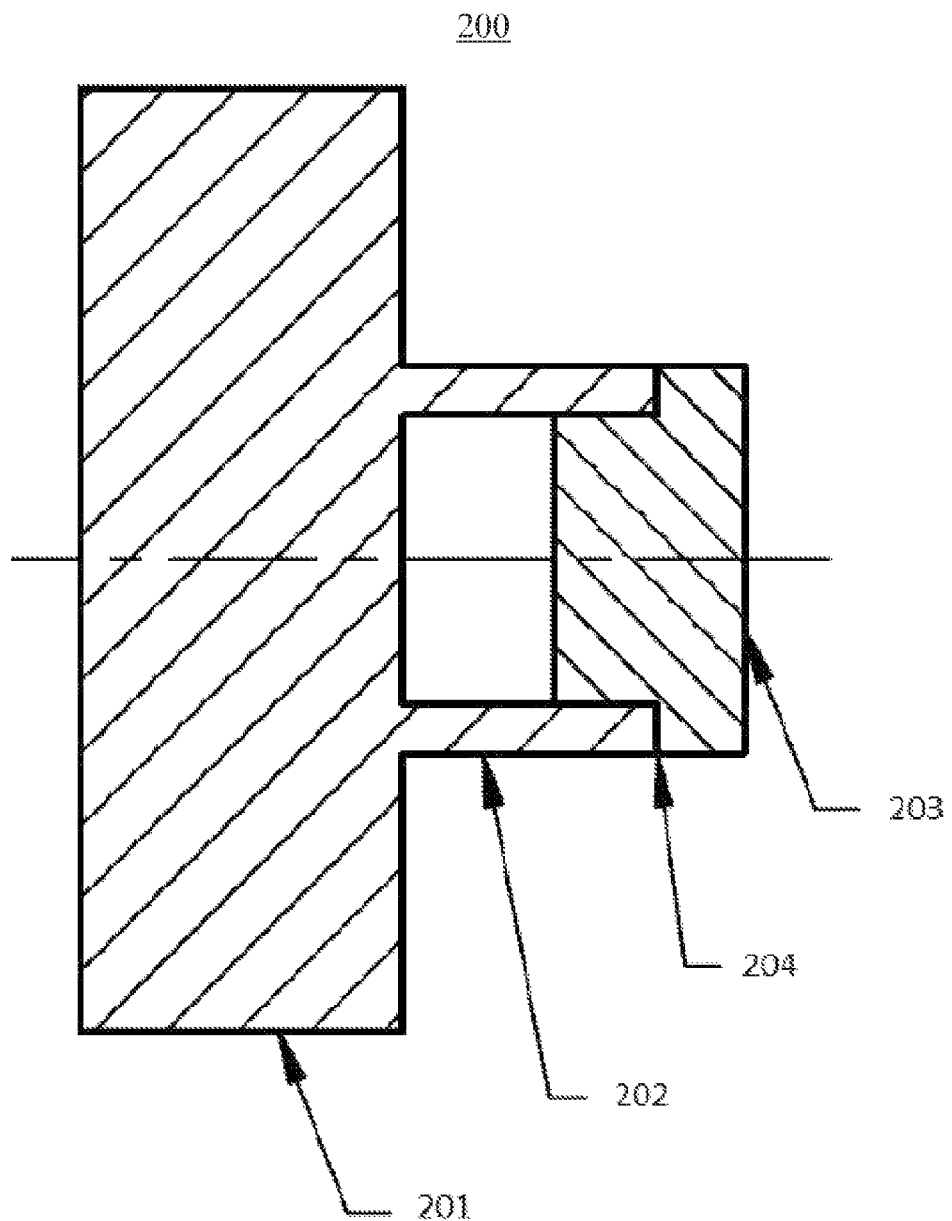
FIG. 2 illustrates a longitudinal cross-sectional view of one embodiment of a structure having a weld disposed between a first component and a second component in accordance with various aspects as described herein.

An example embodiment of the present disclosure, described herein, provides a pressure transducer assembly configuration, and method of manufacturing and using the same, that controls the flow and dissipation of thermal energy away from a weld between two components having different sizes or masses. The two components may be, for example but not limited to, a large mass component and a small mass component. For example, FIG. 2 illustrates a longitudinal cross-sectional view of one embodiment of a structure 200 having a weld 204 disposed between and coupling a first component 201 and a second component 203 in accordance with various aspects as described herein. In FIG. 2, the structure 200 may be configured to include the first component 201 and the second component 203 that are coupled by the weld 204. In one example, a mass of the first component 201 may be greater than a mass of the second component 203. In another example, the second component 203 may be a sensor such as a pressure sensor and the first component 201 may be a header upon which the sensor is mounted. In another example, a lateral cross-sectional area of the structure 200 may be circular, rectangular, another geometrical configuration or the like.

As previously described, the first component 201 may be capable of distributing or dissipating heat within its mass faster than the second component 203, since a mass of the first component 201 is greater than a mass of the second component 203. Further, thermal energy from welding the weld 204 may dissipate slower in the second component 203 than the first component 201, resulting in a temperature of the second component 203 increasing faster and being greater than a temperature of the first component 201. Therefore, this combination may lead to an area near the weld 204 on the second component 203 having a higher temperature for a longer time than an area near the weld 204 on the first component 201.

Additionally, as one skilled in the art will appreciate, thermal energy transfer occurs at a higher rate across materials having higher thermal conductivity than across materials having lower thermal conductivity. Consequently, materials that are thermally conductive have a tendency to distribute and dissipate thermal energy more effectively than non-thermally conductive materials. In one example, the first component 201 such as a header assembly may be composed of a metallic material having thermally conductive properties. Accordingly, as thermal energy is applied by welding the weld 204 on the first component 201, the first component 201 having thermal conductive properties may distribute more thermal energy throughout its mass. Also, as described above, the mass of the first component 201 may enable it to distribute heat from welding the weld 204 faster than the second component 203 since the first component 201 has more mass to distribute the heat.

In FIG. 2, the second component 203 may be made from a material having a lower thermal conductivity than the first component 201. Accordingly, the second component 203 may distribute or dissipate thermal energy less effectively as the first component 201 since the second component 203 has less ability to distribute or dissipate the thermal energy through its mass. Therefore, the first component 201 may distribute or dissipate the thermal energy from welding the weld 204 more effectively than the second component 203, which consequently may cause the weld 204 to weaken, crack, splinter, fail or the like over time. The stress resulting from the uneven distribution or dissipation of the thermal energy from welding the weld 204 may not be immediately or readily apparent, but it may cause the weld to fail due to, for instance, fatigue crack growth over time.

To remedy this mismatch in thermal energy distribution or dissipation between the first component 201 and the second component 203, the first component 201 may be configured to include a protrusion 202. In one example, the first component 201 and the protrusion 202 may be composed of one contiguous material. In another example, the first component 201 may be thermally coupled to the protrusion 202 using a bond, a weld, a fastener or the like. The protrusion 202 may be used to couple the first component 201 to the second component 202. For example, the weld 204 may be welded between the protrusion 202 and the second component 203 to couple the first component 201 to the second component 203. In another example, the weld 204 may include a continuous weld, a contiguous weld, one or more localized welds or the like.

In FIG. 2, the thermal energy applied in forming the weld 204 may distribute or dissipate through the protrusion 202 before the thermal energy reaches the first component 201. Therefore, a length, a width, a volume, a cross-sectional area or the like of the protrusion 202 may be used to modify an amount of thermal energy transferred to the first component 201. This ability to modify the heat distribution or dissipation of the first component 201 using the protrusion 202 may allow for tuning the heat distribution or dissipation of the first component 201 to substantially match a heat distribution or dissipation of the second component 203. In this way, the thermal energy resulting from welding the weld 204 may distribute or dissipate at about an equivalent rate for the first component 201 and the second component 203, which may allow the first component 201 and the second component 203 to remain about equivalent in temperature during the welding process.

It shall be understood that the protrusion 202 may be tuned to compensate for mass differences between the first component 201 and the second component 203. However, the protrusion 202 may also be tuned to compensate for specific materials and their corresponding thermal conductivity properties used to construct the first component 201 or the second component 203. For example, the protrusion 202 may be configured to be a longer length or a wider width if the first component 201 is more thermally conductive than the second component 203. In another example, the protrusion 202 may be configured to be a shorter length or a narrower width if the first component 201 and the second component 203 have about equivalent thermal conductive properties.

Thus, the example embodiment described herein and illustrated in FIG. 2 may provide a controlled cooling environment for the weld 204 for each of the first component 201 and the second component 203 by matching the heat distribution or dissipation rates of the first component 201 and the second component 203. This configuration may lead to a stronger, more durable weld that has longevity such as after many cycles at higher stress.

FIG. 3 is a flowchart of one embodiment of a method 300 of dissipating heat in a structure in accordance with various aspects as described herein. The method 300 may be applied to a structure having a first component thermally coupled to a protrusion and a second component having a lower heat dissipation rate than the first component. In FIG. 3, the method 300 may start at, for instance, block 301, where it may include forming a weld between the protrusion and the second component using a welding process. It is important to recognize that the welding process may generate thermal energy. At block 303, the method 300 may include dissipating, by the first component in combination with the protrusion, the thermal energy from the welding process at a first heat dissipation rate. Further, at block 305, the method 300 may include dissipating, by the second component, the thermal energy from the welding process at a second heat dissipation rate. The first heat dissipation rate may be about equivalent to the second heat dissipation rate. By doing so may reduce, for instance, fatigue crack growth over time.

It is important to recognize that it is impractical to describe every conceivable combination of components or methodologies for purposes of describing the claimed subject matter. However, a person having ordinary skill in the art will recognize that many further combinations and permutations of the subject technology are possible. Accordingly, the claimed subject matter is intended to cover all such alterations, modifications, and variations that are within the spirit and scope of the claimed subject matter.

Although the present disclosure describes specific examples, embodiments, and the like, various modifications and changes may be made without departing from the scope of the present disclosure as set forth in the claims below. For example, although the example methods, devices and systems, described herein are in conjunction with a configuration for the aforementioned structure for tuning weld heat dissipation, the skilled artisan will readily recognize that the example methods, devices or systems may be used in other methods, devices or systems and may be configured to correspond to such other example methods, devices or systems as needed. Further, while at least one example, embodiment, or the like has been presented in the foregoing detailed description, many variations exist. Accordingly, the specification and figures are to be regarded in an illustrative rather than a restrictive sense, and all such modifications are intended to be included within the scope of the present disclosure. Any benefits, advantages, or solutions to problems that are described herein with regard to specific embodiments are not intended to be construed as a critical, required, or essential feature or element of any or all of the claims. Any benefits, advantages, or solutions to problems that are described herein with regard to specific examples, embodiments, or the like are not intended to be construed as a critical, required, or essential feature or element of any or all of the claims.

What is claimed is:

1. A structure, comprising:
   a protrusion;
   a first component thermally coupled to the protrusion;
   a second component having a lower heat dissipation rate than the first component;
   a weld disposed between the protrusion and the second component, the weld coupling the protrusion with the second component;
   a weld cooling clearance between the first component and the second component; and
   wherein the protrusion compensates a heat dissipation rate difference between the first component and the second component.

2. The structure of claim 1, wherein a mass of the first component is greater than a mass of the second component.

3. The structure of claim 1, wherein the protrusion and the first component are composed of a contiguous material.

4. The structure of claim 1, wherein the weld includes a continuous weld.

5. The structure of claim 1, wherein the weld includes one or more localized welds.

6. The structure of claim 1, wherein a length of the protrusion compensates the heat dissipation rate difference between the first component and the second component.

7. The structure of claim 1, wherein a width of the protrusion compensates the heat dissipation rate difference between the first component and the second component.

8. The structure of claim 1, wherein a cross-sectional area of the protrusion compensates the heat dissipation rate difference between the first component and the second component.

9. The structure of claim 1, wherein the first component is a header and the second component is a sensor.

10. The structure of claim 1, wherein each of the first component and the protrusion is composed of a thermally conductive material.

* * * * *